United States Patent
Huang et al.

(10) Patent No.: US 9,690,802 B2
(45) Date of Patent: *Jun. 27, 2017

(54) STREAM LOCALITY DELTA COMPRESSION

(71) Applicant: EMC Corporation, Hopkinton, MA (US)

(72) Inventors: Mark Huang, Seattle, WA (US); Philip Shilane, Morrisville, PA (US); Grant Wallace, Ewing, NJ (US); Nitin Garg, Mountain View, CA (US); Edward K. Lee, San Jose, CA (US); Ming Benjamin Zhu, Austin, TX (US); Kai Li, Seattle, WA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/723,196

(22) Filed: May 27, 2015

(65) Prior Publication Data

US 2015/0261779 A1    Sep. 17, 2015

Related U.S. Application Data

(63) Continuation of application No. 13/764,358, filed on Feb. 11, 2013, now Pat. No. 9,069,785, which is a continuation of application No. 12/291,989, filed on Nov. 14, 2008, now Pat. No. 8,447,740.

(51) Int. Cl.
*G06F 17/00* (2006.01)
*G06F 17/30* (2006.01)

(52) U.S. Cl.
CPC .. *G06F 17/30162* (2013.01); *G06F 17/30153* (2013.01); *G06F 17/30156* (2013.01); *G06F 17/30864* (2013.01)

(58) Field of Classification Search
None
See application file for complete search history.

(56) References Cited

U.S. PATENT DOCUMENTS

| | | | |
|---|---|---|---|
| 7,519,635 B1 | 4/2009 | Haustein et al. | |
| 8,190,835 B1 * | 5/2012 | Yueh | G06F 3/0608 711/159 |
| 2008/0013830 A1 * | 1/2008 | Patterson | G06F 11/1451 382/173 |
| 2008/0104107 A1 * | 5/2008 | Schwaab | G06F 11/1453 |
| 2008/0104146 A1 * | 5/2008 | Schwaab | G06F 11/1451 |
| 2008/0195597 A1 * | 8/2008 | Rosenfeld | G06F 17/30017 |
| 2009/0013129 A1 * | 1/2009 | Bondurant | G06F 3/0608 711/115 |
| 2009/0234795 A1 | 9/2009 | Haas et al. | |
| 2009/0313248 A1 * | 12/2009 | Balachandran | H03M 7/3084 |
| 2010/0114833 A1 | 5/2010 | Mu | |
| 2015/0261779 A1 * | 9/2015 | Huang | G06F 17/30156 707/692 |

* cited by examiner

*Primary Examiner* — Hung Le
(74) *Attorney, Agent, or Firm* — Blakely, Sokoloff, Taylor & Zafman LLP

(57) ABSTRACT

Stream locality delta compression is disclosed. A previous stream indicated locale of data segments is selected. A first data segment is then determined to be similar to a data segment in the stream indicated locale.

24 Claims, 12 Drawing Sheets

STREAM LOCALITY DELTA COMPRESSION

CROSS REFERENCE TO OTHER APPLICATIONS

This application is a continuation of U.S. patent application Ser. No. 13/764,358, entitled STREAM LOCALITY DELTA COMPRESSION filed Feb. 11, 2013 which is incorporated herein by reference for all purposes, which is a continuation of U.S. patent application Ser. No. 12/291,989, now U.S. Pat. No. 8,447,740, entitled STREAM LOCALITY DELTA COMPRESSION filed Nov. 14, 2008 which is incorporated herein by reference for all purposes.

BACKGROUND OF THE INVENTION

Enterprises as well as individuals are becoming increasingly dependent on computers. As more and more data are generated, the need for efficient and reliable data backup storage systems is increasing. There are a variety of systems in existence today, utilizing both local and network storage for backup. Some of these storage systems use data segmentation and deduplication to more efficiently store the data. Deduplicating backup systems break an incoming data stream into a series of data segments and test the system for the presence of each data segment before storing it, in order to avoid storing it multiple times. Some deduplicating backup systems can achieve high data compression factors of 10 to 50 or more. However, for a large enterprise system, a backup system compressed by deduplication can still be so large as to be cumbersome.

BRIEF DESCRIPTION OF THE DRAWINGS

Various embodiments of the invention are disclosed in the following detailed description and the accompanying drawings.

DETAILED DESCRIPTION

Figure 1:
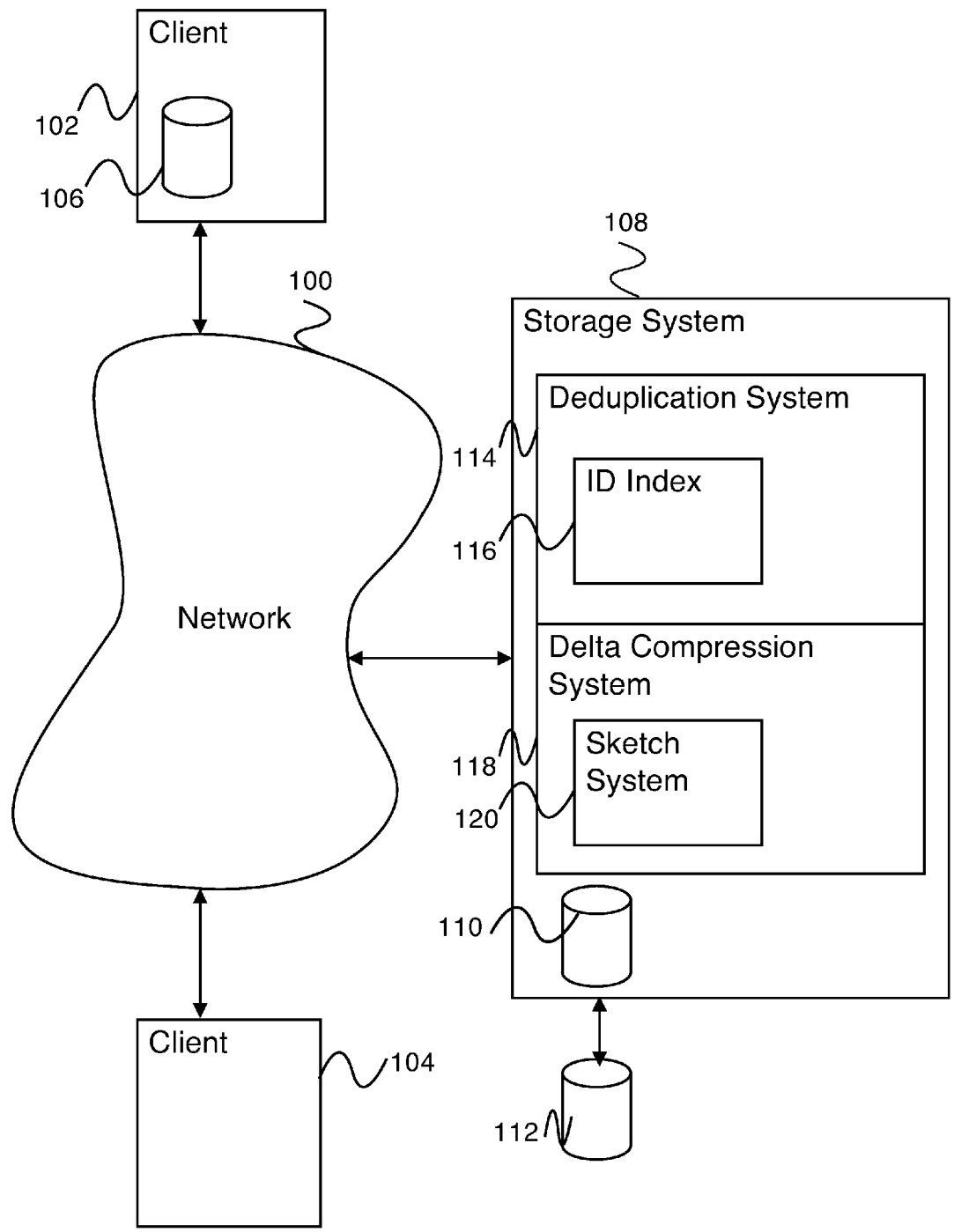
FIG. 1 is a block diagram illustrating a system for delta compression after identity deduplication.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Stream locality delta compression is disclosed. Deduplicating systems break an incoming data stream into a series of data segments and test the system for the presence of each data segment before storing it, in order to avoid storing it multiple times. When used on enterprise systems where there is a high degree of data redundancy, deduplication can reduce the total amount of data stored by a large amount. After redundant segment data has been removed from the storage system by deduplication, there is still redundancy that can be removed in the form of similar data segments with small differences. Delta compression identifies a previously stored data segment that is similar to a segment that is desired to be stored and compresses it by storing the segment that is desired to be stored as a reference to the previously stored segment and storing a delta (or difference) from the previously stored difference. In some embodiments, a segment that is desired to be stored can also be stored as a delta from a segment that has been previously stored as a reference and a delta. For segments that are very similar but not identical, no data reduction would be achieved by deduplication alone, but a large amount of data reduction is possible with delta compression.

In various embodiments, the balance of identity deduplication and delta compression are balanced in their usage in a variety of configurations: identity deduplication always first for a segment and then delta compression on segments that are not found to be previously stored; identity deduplication for a few selected segments and then delta compression on segments that are not found to be previously stored and for a next series of segments after the first segment; no identity deduplication and delta compression on all segments for which stream local segments are identified by one or more of the following: a file name, a stream identifier, a stream source, a client name, or any other appropriate way of identifying local segments.

Some delta compression systems determine if an incoming data segment is similar to a previously stored data segment by creating a reduced version of the data segment referred to as a sketch. The sketches of two data segments can be compared to quickly determine whether the two segments are similar. In some systems, sketches can be compared to quickly determine a degree of similarity. An indexed database of sketches of all stored data segments can be searched to locate the data segment that is most similar to the incoming data segment and perform optimal delta compression. However, performing delta compression using a sketch index becomes cumbersome on large systems due to the large size of the sketch index. The sketch index may become too large to store in low-latency memory, necessitating access to high-latency memory every time delta compression is to be performed.

Stream locality delta compression replaces the master sketch index with a limited index of sketches of stored data segments. The database system maintains the limited index with sketches believed likely to be similar to an incoming data segment, and only searches the limited index. Segments are identified as likely to be similar to an incoming data segment by using stream locality. When an incoming data segment is determined to be identical to a previously stored data segment, the database system loads a set of sketches of data segments received or stored in proximity to the previously stored data segment into the limited sketch index. When an incoming data segment is not determined to be identical to a previously stored data segment, its sketch is compared against the sketches in the limited sketch index to locate a similar data segment. If no similar data segments are located using the limited sketch index, the data segment is stored without delta compression.

In some embodiments, deduplication of segments (e.g., identity compression) is not performed and/or used in conjunction with stream-locality delta compression in which case the stream locality sketches are identified and loaded to a sketch cache or index based at least in part on metadata associated with a segment (e.g., a file name, a backup client name, a system name associated with a backup, other non-content based information, etc.).

A sketch is referred to as "found" in the limited sketch index if it demonstrates an appropriate degree of similarity to one or more other sketches in the limited sketch index (e.g., matching at least a predetermined threshold number of the elements between two sketches, etc.). It is referred to as "not found" in the sketch index if it does not demonstrate an appropriate degree of similarity to one or more other sketches in the limited sketch index (e.g., matching less than a predetermined threshold number of the elements between two sketches, etc.). If a sketch is "found" in the limited sketch index, it is likely that the data segment associated with the sketch is similar to the one or more other data segments associated with the one or more other sketches with which it demonstrates an appropriate degree of similarity.

In some embodiments, a segment is similar to more than one previously stored segment or portions thereof and the more than one previously stored segments are used for the encoding of the segment. For example, a segment's first half is similar to a first previously stored segment and a segment's second half is similar to a second previously stored segment; the segment is stored by using a reference to the first and second previously stored segments and indicators for which portion(s) of the segments are used and in what manner they are used to be able to reconstruct the segment (e.g., by indicating a portion of the first segment matched to and the delta from it and a portion of the second segment matched to and the delta from it).

In some embodiments, a sketch system uses a cache (e.g., a sketch cache) to find similar segments. In some embodiments, a sketch system uses one or more functions to characterize a segment and can use the characteristics generated by those functions to determine similarity and in some cases degree or amount of similarity.

Some embodiments of stream locality delta compression maintain a limited sketch index and a master sketch index. The master sketch index is accessed only when the sketch of the incoming data segment is not found in the limited sketch index. This reduces the total number of accesses to the master sketch index without reducing the total amount of delta compression that is achievable.

In some embodiments, stream locality delta compression is used for data replication or transmission enabling more efficient replication or transmission, where a source system and a replica system are both able to reconstruct a given segment or a source system is able to transmit a segment to a destination system more efficiently and the source and destination system can both reconstruct a given segment. In some embodiments, stream locality delta compression in combination with identity compression is used for data replication/transmission, where a source system and a replica system are both able to reconstruct a given segment or a source system is able to transmit a segment to a destination system more efficiently and the source and destination system can both reconstruct a given segment.

FIG. 1 is a block diagram illustrating a system for delta compression after identity deduplication. In the example shown, network 100 connects one or more clients, represented in FIG. 1 by clients 102 and 104. A client may have a local storage device in addition to local memory. For example, client 102 has storage device 106, whereas client 104 does not have a local storage device. Network 100 also connects to storage system 108. Storage system 108 stores data either using internal storage device 110 or attached external storage device 112.

Storage system 108 comprises deduplication system 114, which performs segment deduplication on an incoming data stream. Segment deduplication is assisted by identifier (ID) index 116, which comprises ID data associated with each segment used to store data and/or files by storage system 108, along with a corresponding location in a data storage unit of the segment (e.g., internal storage device 110, external storage device 112, a storage system cache, a local memory, or any other appropriate storage unit). Storage system 108 comprises delta compression system 118, which performs delta compression on an incoming data stream. Delta compression is assisted by sketch cache 120 (e.g., a sketch index), which comprises sketch data associated with some or all of the segments used to store data and/or files by storage system 108, along with the corresponding location in memory of the segment. In some embodiments, sketch data comprises one or more data characterizing a segment. In some embodiments, one or more functions (e.g., hash functions) act on a segment and a subset of the results of the functions acting on the segment (e.g., a number of results, for example the ten lowest results or the ten highest results) are selected as a sketch.

Network 100 comprises one or more of the following: a local area network, a wide area network, a wired network, a wireless network, the Internet, a fiber network, a storage area network, or any other appropriate network enabling communication. Clients 102 and 104 may be in physical proximity or may be physically remote from one another. Storage system 108 may be located in proximity to one, both, or neither of clients 102 and 104.

In various embodiments, storage devices 106, 110 and 112 comprise a single storage device such as a hard disk, a tape drive, a semiconductor memory, a plurality of storage devices such as a redundant array system (e.g., a redundant array of independent disks (RAID)), a system for storage such as a library system or network attached storage system, or any other appropriate storage device or system.

In various embodiments, storage system 108 comprises one or more processors as part of one or more physical units (e.g., computers or other hardware units).

In some embodiments, files or data stored on a client are backed up on storage system 108. The files or data are broken into segments by storage system 108. A mapping is stored between the files or data and the segments. If an identical segment is already stored by storage system 108, a pointer to the segment is stored. If a similar segment is already stored by storage system 108, a pointer to the similar previously stored segment is stored as well as the difference between the similar previously stored segment and the new segment to be stored. The mapping along with the pointers, stored segments and stored similar segments and differences from the similar segments can be used to reconstruct the original files or data.

Figure 2:
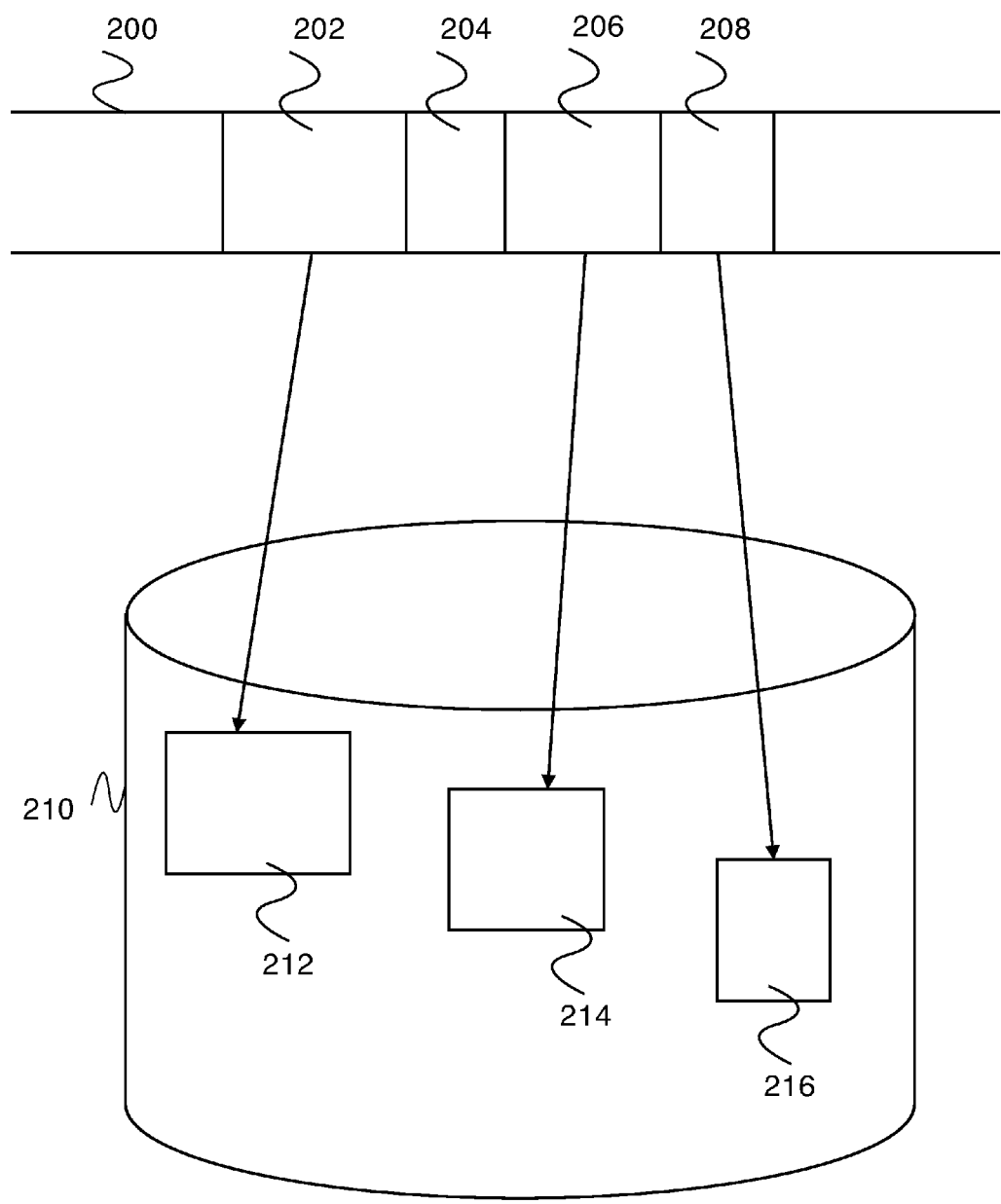
FIG. 2 is a block diagram illustrating an embodiment of a segment deduplication data storage system.

FIG. 2 is a block diagram illustrating an embodiment of a segment deduplication data storage system. In the example shown, data stream or data block 200 is received by a data storage system (e.g., storage system 108 of FIG. 1). Data stream or data block 200 is sent from one or more clients (e.g., client 102 or client 104 of FIG. 1). Data stream or data block 200 is to be stored in storage device 210, representing a storage device of a storage system (e.g., storage device 110 or storage device 112 of storage system 108 of FIG. 1).

Data stream or data block 200 is segmented into segments 202, 204, 206 and 208. Data stream or data block 200 is segmented by creating a plurality of segments from data stream or data block 200 that can be used to reconstruct data stream or data block 200. Segments, when used to reconstruct data stream or data block 200, can be overlapping, non-overlapping, or a combination of overlapping and non-overlapping. Segment boundaries are determined using file boundaries, directory boundaries, byte counts, content-based boundaries (e.g., when a hash of data in a window is equal to a value), or any other appropriate method of determining a boundary. Reconstruction of a data block, data stream, file, or directory includes using one or more references to the one or more segments that originally made up a data block, data stream, file, or directory that was/were previously stored.

Storage device 210 is checked for existence of data segments to be stored (e.g., to see if a data segment is currently already stored), such as data segments 202, 204, 206, and 208. Data segments are stored if found to not exist within the storage device. Existence checking is performed by generating a smaller ID data and searching a table of IDs (e.g., an ID index such as ID index 116 of FIG. 1) corresponding to segments currently stored for the ID of the data segment to be stored. In some embodiments, existence checking is performed by searching storage device 210 for the entire data segment to be stored. ID data for a given data segment is derived from the content of the data of the segment, and is generated deterministically (e.g., a digital fingerprint, digital signature, using a hash function, a checksum, a cryptographic hash function, etc.). In various embodiments, ID data is not derived from the content of the data, is generated randomly, or any other appropriate manner for the storage system.

In the example shown, data segments such as segments 202, 206, and 208 are found not to exist in storage device 210 and are designated to be stored in storage device 210—for example, segments 202, 204, and 206 are to be stored as data segments 212, 214, and 216, respectively. Segment 204 is found to exist within storage device 210, so a reference to 204 (not shown in FIG. 2) is stored in order to be able to reconstruct data stream or data block 200.

Figure 3:
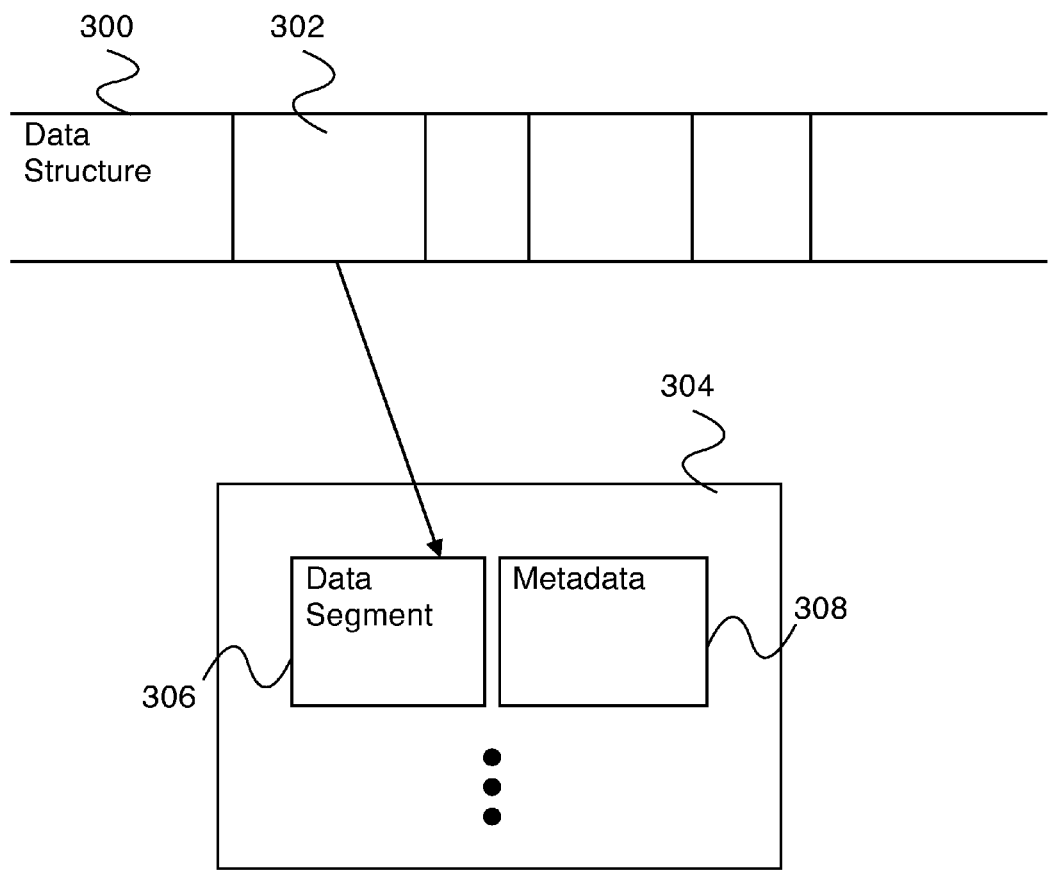
FIG. 3 is a block diagram illustrating an embodiment of data segmentation and storage.

FIG. 3 is a block diagram illustrating an embodiment of data segmentation and storage. In the example shown, data stream 300 is received by a data storage system (e.g., storage system 108 of FIG. 1). Data stream 300 is sent from one or more clients (e.g., client 102 or client 104 of FIG. 1). Data stream 300 is to be stored in a storage device of a storage system (e.g., storage device 110 or storage device 112 of FIG. 1). Data stream 300 is segmented into a plurality of data segments, including data segment 302. In some embodiments, segments are segmented by identifying segment boundaries that are content-based—for example, a hash function is applied to values of data within a sliding window through the data stream or block and when the hash function is equal to a value (or equal to one of several values) then a segment boundary is identified. In various embodiments, segment boundaries are identified using content based functions operating on windows within a data stream or block that have a minimum or maximum or other value or any other appropriate content based segmenting algorithm. In various embodiments, segments comprise fixed-length segments, variable length segments, overlapping segments, non-overlapping segments, segments with a minimum size, segments with a maximum size, or any other appropriate segments. In various embodiments, segments comprise files, groups of files, directories, a portion of a file, a portion of a data stream with one or more boundaries unrelated to file and/or directory boundaries, or any other appropriate segment.

Data segment 302 is stored in the storage system as stored data segment 306. Stored data segment 306 is stored as part of data storage container 304. Data storage container stores one or more data segments along with metadata associated with the data segments. For example, metadata associated with data segment 306 is stored as metadata 308. Metadata 308 comprises a data segment ID and a data segment sketch. In various embodiments, a data segment ID comprises a deterministic function of a data segment, a plurality of deterministic functions of a data segment, a hash function of a data segment, a plurality of hash functions of a data segment, random data, or any other appropriate data segment ID. In various embodiments, a data segment sketch comprises one or more deterministic functions of a data segment, one or more hash functions of a data segment, one or more functions that return the same value for similar data segments, one or more functions that return similar values for similar data segments, one or more functions that may return the same value for similar data segments (e.g., a function that probably or likely returns a same value for a similar data segment), one or more functions that may return similar values for similar data segments (e.g., a function that probably or likely returns a similar value for a similar data segment), or any other appropriate data segment sketch. In various embodiments, sketch function values are determined to be similar using one or more of the following methods: numeric difference, hamming difference, locality-sensitive hashing, nearest-neighbor-search, other statistical methods, or any other appropriate methods of determining similarity.

In various embodiments, metadata (e.g., metadata 308) comprises a data segment ID, a data segment sketch, a hash of a data segment, an encrypted hash of a data segment, random data, or any other appropriate metadata.

In some embodiments, metadata associated with a segment is used to identify identical and/or similar data segments. In some embodiments, stored metadata enables a faster identification of identical and/or similar data segments as an identifier (e.g., and ID) and/or sketch (e.g., a set of values characterizing the data segment) do not need to be recomputed for the evaluation of a given incoming data segment.

Figure 4:
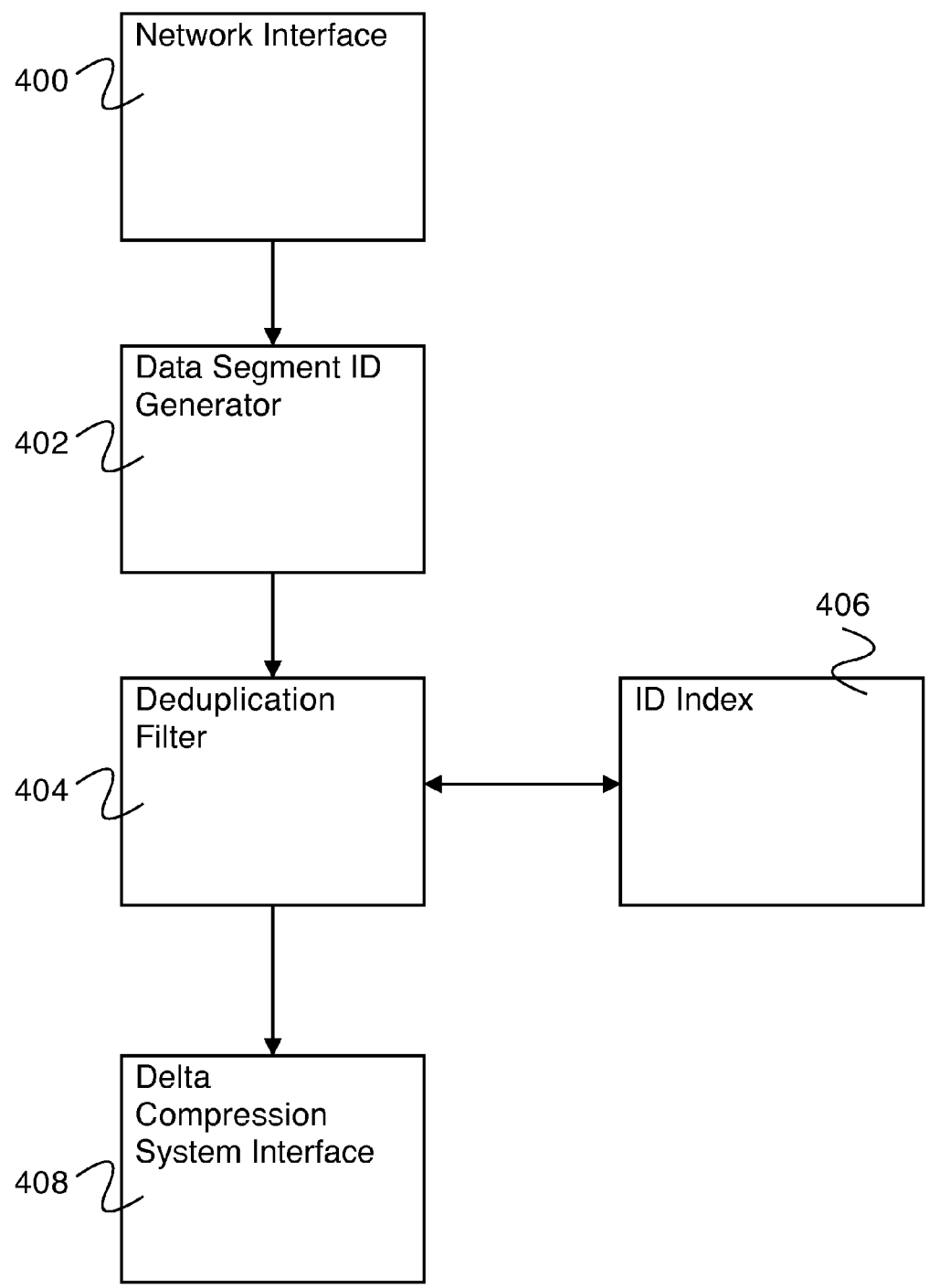
FIG. 4 is a block diagram illustrating an embodiment of a deduplication system.

FIG. 4 is a block diagram illustrating an embodiment of a deduplication system. In some embodiments, the deduplication system of FIG. 4 implements deduplication system 114 of FIG. 1. In the example shown, a data segment to be stored is received by network interface 400 and is passed to data segment ID generator 402. Data segment ID generator 402 generates a data segment ID from the data segment and passes the ID to deduplication filter 404. Deduplication filter 404 then queries ID index 406 for the data segment ID. If the data segment ID is found in ID index 406, deduplication filter 404 does not allow the data segment to be stored. If the ID is not found in ID index 406, deduplication filter 404 passes the received data segment to a delta compression system via delta compression system interface 408.

In some embodiments, in the event that a data segment is not new, a reference is stored as well as other information such that an incoming data stream or data block or file thereof is able to be reconstructed using the previously stored data segment.

In some embodiments, in the event that the data segment is new, the data segment is stored as well as other information such that an incoming data stream or data block or file thereof is able to be reconstructed using the newly stored data segment.

Figure 5:
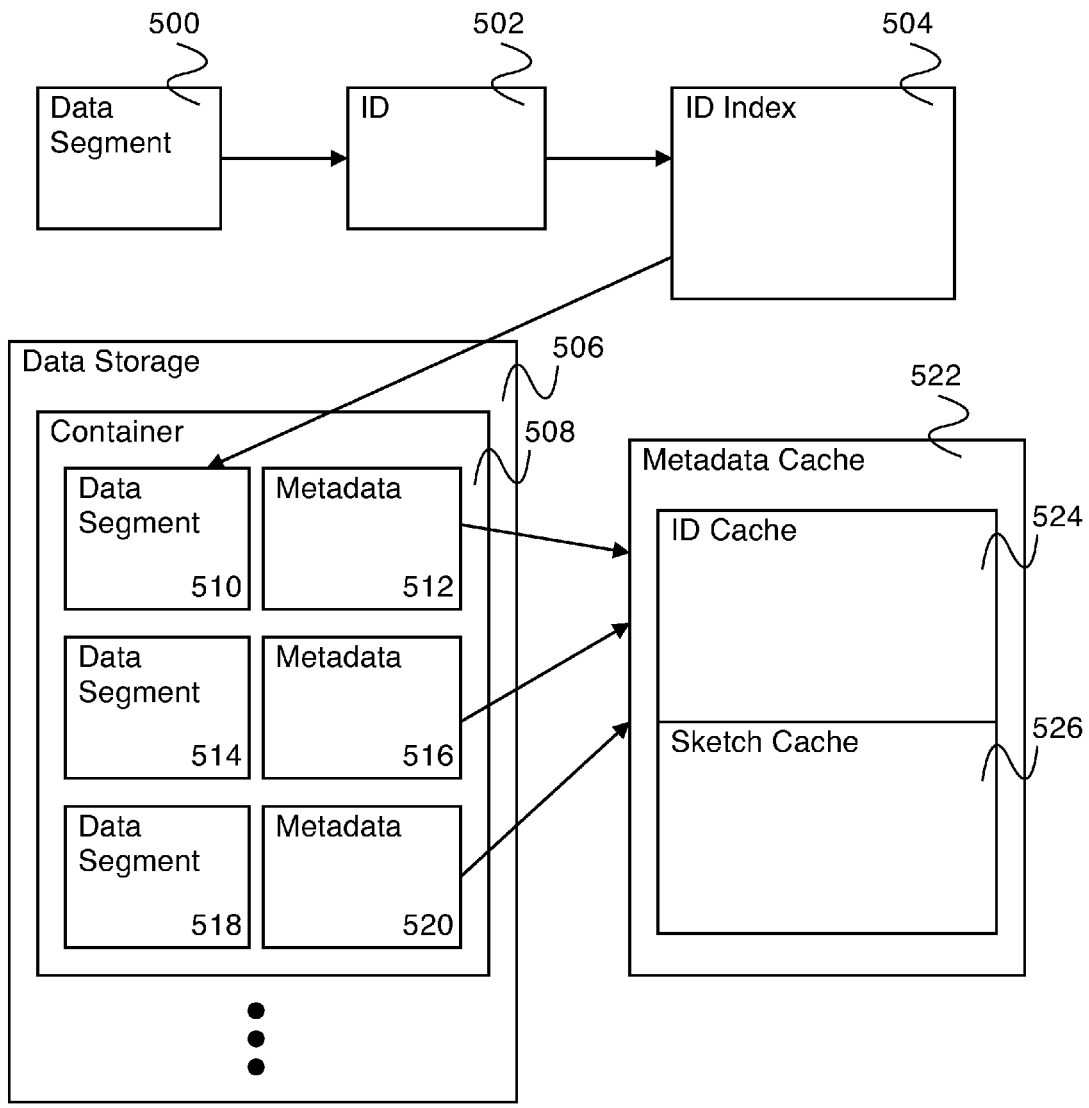
FIG. 5 is a block diagram illustrating an embodiment of a deduplication system with stream locality caching.

FIG. 5 is a block diagram illustrating an embodiment of a deduplication system with stream locality caching. In some embodiments, the deduplication system of FIG. 5 performs stream locality caching in a deduplication system (e.g. deduplication system 114 of FIG. 1). In the example shown, received data segment 500 undergoes deduplication and is found to be already present in the data storage device. The storage system creates data segment ID 502 from data segment 500 and queries ID index 504 (e.g. an ID index analogous to ID index 116 of FIG. 1) for the data segment ID. Data segment ID 502 is located in ID index 504, and a reference is returned from ID index 504 indicating data segment 500 is stored in data storage 506 as stored data segment 510. Stored data segment 510 is stored in data container 508 (e.g. a data container analogous to container 304 of FIG. 3) along with data segments 514 and 518 and metadata segments 512, 516, and 520, corresponding to the three stored data segments 510, 514 and 518, respectively. Data segment 514 and data segment 518 represent one or more data segments that are stream local to data segment 510 (e.g., a data segment that was received at a time similar or close to the time that data segment 510 was received, within a time window around the time that data segment 510 was received, or close to data segment 510 within a data stream or a data block or local to where data is stored (e.g., spatially on a storage medium or within a local address space, or any other appropriate stream local criteria). When received data segment 500 is identified as stored data segment 510 in container 508, each metadata segment stored in container 508 is loaded into metadata cache 522. The ID part of each metadata segment is loaded into ID cache 524 and the sketch part of each metadata segment is loaded into sketch cache 526 (e.g. a sketch cache analogous to sketch cache 120 of FIG. 1). In some embodiments, if metadata cache 522 is already full, a previously added metadata segment is removed from the cache in order to make room for the new metadata segment.

In some embodiments, identity deduplication is not performed and stream local data segments or metadata associated with stream local segments are identified using one or more of the following: a file name, a stream identifier, a stream source, a client name, a system source name, or any other appropriate manner of identifying stream local segments.

Figure 6:
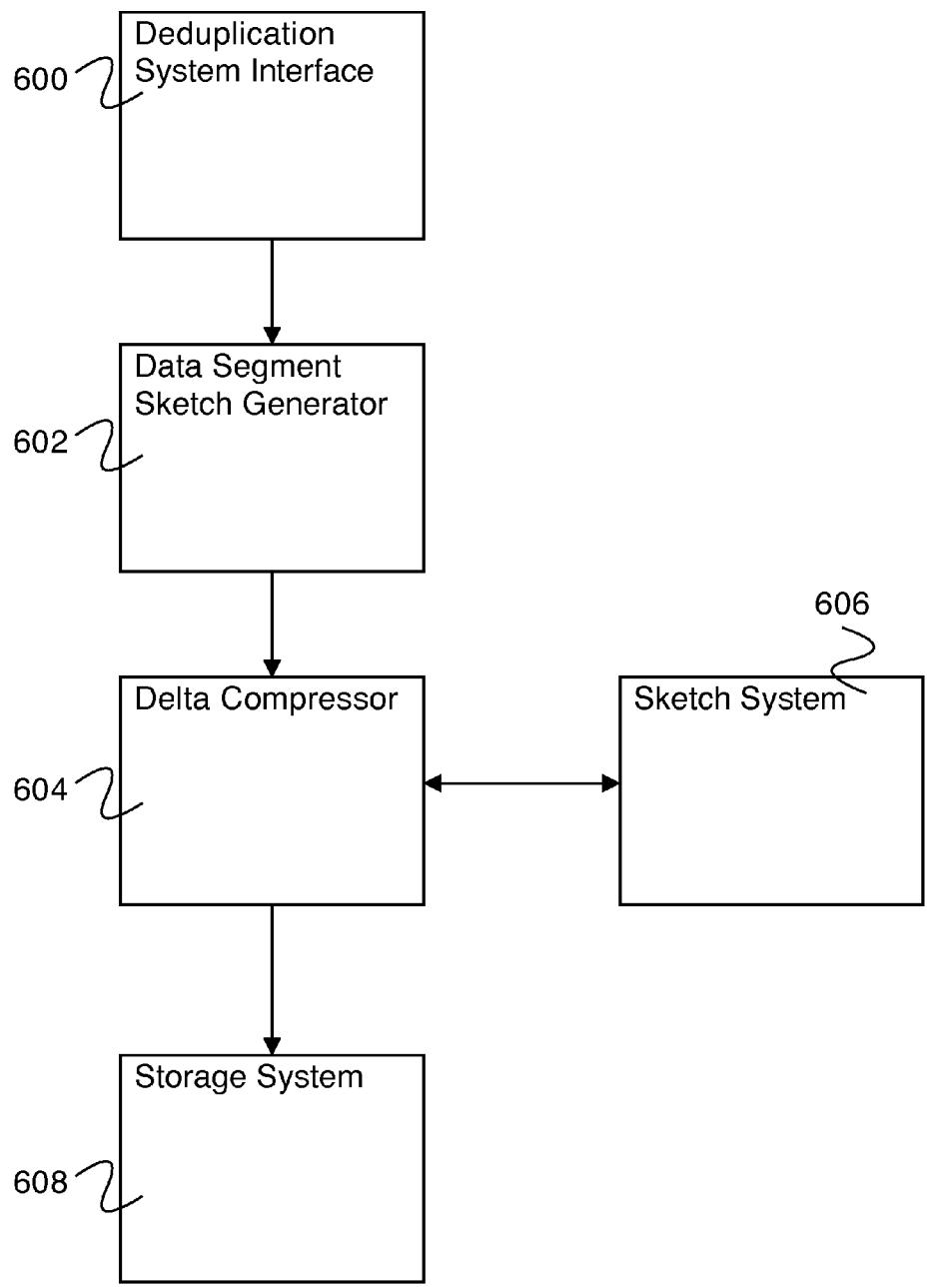
FIG. 6 is a block diagram illustrating an embodiment of a delta compression system.

FIG. 6 is a block diagram illustrating an embodiment of a delta compression system. In some embodiments, the delta compression system of FIG. 6 implements delta compression system 118 of FIG. 1. In the example shown, a data segment to be stored is received by deduplication system interface 600 and is passed to data segment sketch generator 602. Data segment sketch generator 602 generates a data segment sketch from the data segment and passes the sketch to delta compressor 604. Delta compressor 604 then queries sketch system 606 for the data segment sketch. If the data segment sketch is found to be similar or identical to one or more previously stored segment sketches by sketch system 606, delta compressor 604 performs delta compression on the received data segment using the one or more data segments associated with the one or more sketches found to be similar or identical by sketch system 606 as a base segment. The delta compressed data segment is then passed to storage system 608 and stored. If the sketch is not found to be similar or identical by sketch system 606, delta compressor 604 passes the received data segment to storage system 608 to be stored as a new data segment in the storage system.

Figure 7:
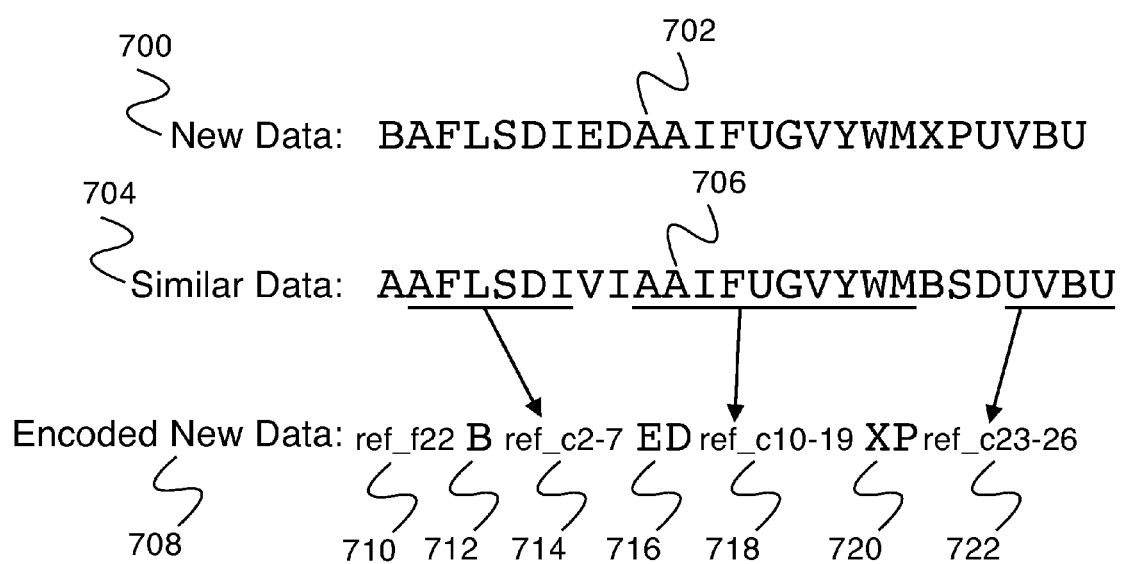
FIG. 7 is a diagram illustrating an embodiment of delta compression.

FIG. 7 is a diagram illustrating an embodiment of delta compression. In some embodiments, delta compression is performed by delta compressor 604 of FIG. 6. In the example shown, new data 700 is to be delta compressed. New data 700 comprises character sequence 702. Similar data 704 has been identified previously to be similar to new data 700. Similar data 704 comprises character sequence 706. In various embodiments, similar data 704 is identified to be similar to new data 700 using a sketch index, a sketch cache, database searching, or by any other appropriate method. Encoded new data 708 comprises reference 710 (e.g., a reference to a previously stored segment), character sequence references 714, 718, and 722 (e.g., a reference to a sequence of data from within the previously stored segment identifying the subset of the segment for example using offsets, lengths or any other appropriate manner of identifying the subset), and character sequences 712, 716, and 720 (e.g., a sequence of data—for example, a string of characters, bytes, integers, whole numbers or other—that is to be inserted in between the reference sequences). Reference 710 refers to similar data 704 and indicates that the character sequence references refer to character sequences found in similar data 704. Character sequence reference 714 indicates that characters 2-7 of similar data 704 are to be inserted in its position when reconstructing new data 700 from encoded new data 708; character sequence reference 718 indicates that characters 10-19 of similar data 704 are to be inserted in its position when reconstructing new data 700 from encoded new data 708; and character sequence reference 722 indicates that characters 23-26 of similar data 704 are to be inserted in its position when reconstructing new data 700 from encoded new data 708. Character sequences 712, 716, and 720 are not found in similar data 704, so they appear unchanged in encoded new data 708 and remain when new data 700 is reconstructed from encoded new data 708.

In some embodiments, the encoding comprises an indication of a set of data blocks in the second data segment not present in the third previous data segment and an indication of a set of data blocks in the third previous data segment. In some embodiments, encoded new data sequences use other encoding schemes that enable the indication of using portion(s) of one or more previously stored segments and differences (e.g., similar to the character sequences above) to store a new data segment. In various embodiments, the similar data and the new data comprise sets of characters, bytes, integers, whole numbers, dates, and/or any other appropriate data or combination thereof.

In some embodiments, the delta encoding comprises an ordered set of copy and insert instructions. New data 700 and similar data 704 are first broken into regions. Region boundaries are determined using file boundaries, directory boundaries, byte counts, content-based boundaries (e.g., when a hash of data in a window is equal to a value), or any other appropriate method of determining a boundary. ID data is computed for each region of new data 700 and similar data 704. ID data for a given data region is derived from the content of the data of the region and is generated deterministically (e.g., a digital fingerprint, digital signature, using a hash function, a checksum, a cryptographic hash function, etc.). The IDs of regions of similar data 704 are kept in a searchable list. The list of region IDs from similar data 704 is checked for each region ID from new data 700. If a region ID from new data 700 is not found in the list of region IDs from new data 700, an insert instruction is added to encoded new data 708, followed by the corresponding data region from new data 700.

If a region ID from new data 700 is found in the list of region IDs from new data 700, the corresponding data regions are identical. The regions are then extended from the front and back while checking to make sure that the regions still match. When the largest possible matching region has been found, a copy instruction is added to encoded new data 708 indicating to copy the matching region from similar data 704 when decoding encoded new data 708. If extending the ends of the data region causes the region to overlap data that has been included in encoded new data 708 as part of a previous copy or insert instruction, the previous instruction is modified to remove the overlap. The copy and insert instructions are stored or transmitted when the entire new data 700 can be reconstructed from the copies of similar data 704 and the insertions.

In some embodiments, data from two or more similar segments is used to encode a new data segment. Reconstruction of data from the two or more similar segment encoding is achieved using copy references to region(s) of the two or more similar segments and insertions.

Figure 8:
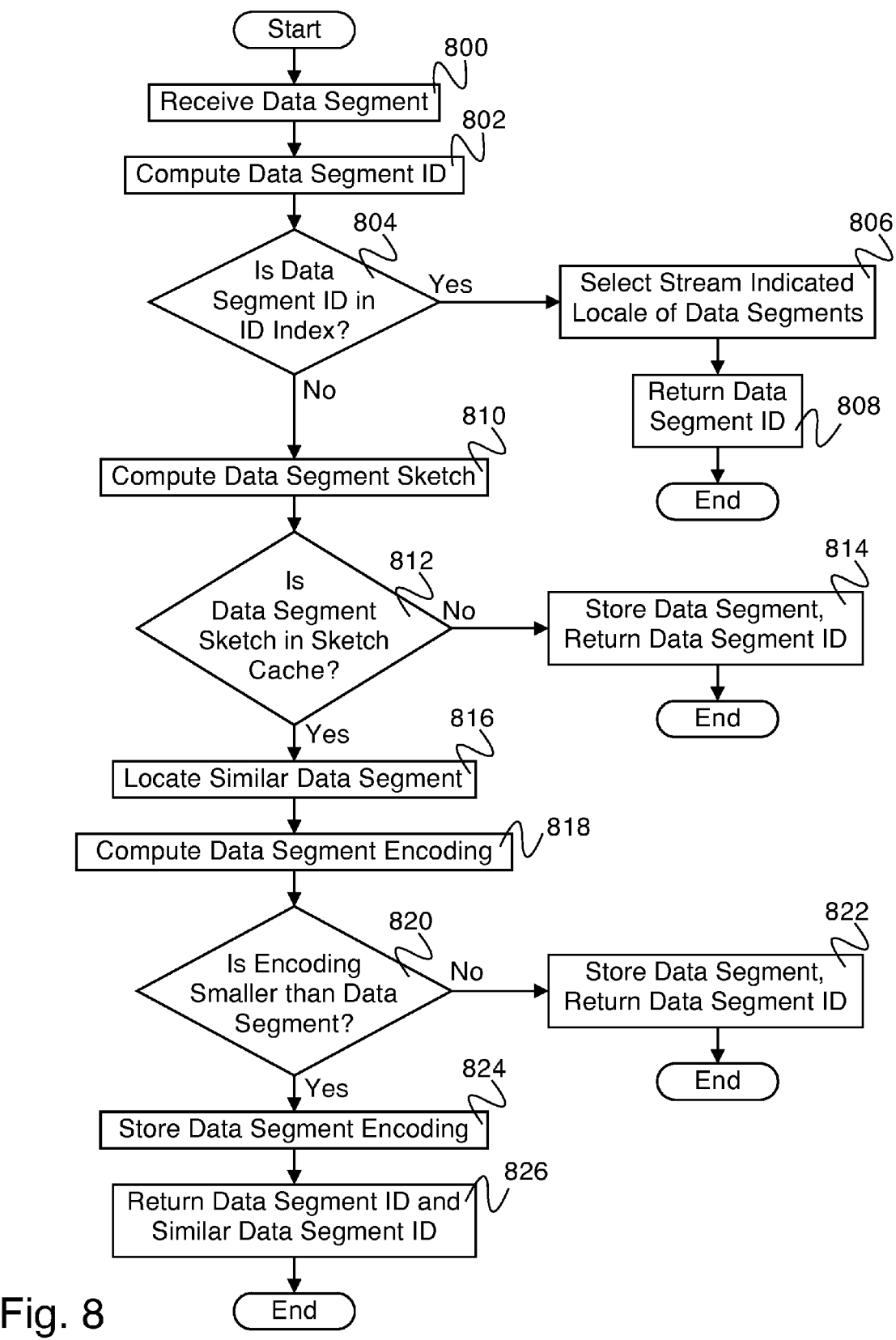
FIG. 8 is a flow diagram illustrating an embodiment of a process for stream locality delta compression.

FIG. 8 is a flow diagram illustrating an embodiment of a process for stream locality delta compression. In some embodiments, the process of FIG. 8 is used by storage system 108 of FIG. 1 to perform stream locality delta compression. In the example shown, in 800, a data segment is received by the data storage system. The data segment received in 800 is part of a received data stream or data block comprising a plurality of data segments. In 802, the data segment ID is computed by the data storage system. The data segment ID is used to determine whether the data segment is identical to a previous data segment. In various embodiments, determining the data segment ID uses one or more of the following: a fingerprint function, a hash function, a cryptographic hash function, a digital signature, or any other appropriate method for determining a data segment ID. In 804 the ID index (e.g., ID index 116 of FIG. 1) is checked for the ID computed in 802. In the event that the ID computed in 802 is located in the ID index, then the data segment is determined to be identical to a previous data segment, and control passes to 806. In 806, a stream indicated locale of data segments is selected. Selecting a stream indicated locale of data segments comprises selecting a set of data segments received or stored in proximity to the previous data segment. Sketch data associated with data segments in the stream indicated locale is added to the sketch cache (e.g. sketch cache associated with a sketch system). In 808, the data segment ID is returned, and the process ends. In some embodiments, a reference to the received data segment is stored, enabling reconstruction of a data stream or data block associated with the received data segment. In various embodiments, a data stream or data block can include a plurality of files, data structures, file structures, metadata information, or any other appropriate data. In some embodiments, the received data segment is not stored after it is determined to be identical to a previous data segment.

In some embodiments, in the event that the ID computed is identical to an ID in an ID index, a check is preformed to determine if the received segment is identical to the previously stored segment (e.g., a byte by byte comparison of the received segment and the previously stored segment).

In the event that the data segment ID is not found in the ID index in 804, then the data segment is not determined to be identical to a previous data segment, and control passes to 810. In 810, the data segment sketch is computed by the data storage system. The data segment sketch is used to determine whether the data segment is similar to a data segment in the locale. In various embodiments, a sketch system comprises a sketch index which associates data segment sketches with data segment IDs, a sketch cache which associates a subset of data segment sketches with data segment IDs (e.g., sketches associated with segments that are of a locale—for example, those that are proximal in time or space from an original data stream/block or from a stored perspective on a storage medium for example close physically or in terms of logical addressability), or any other appropriate system for identifying similar sketches. In various embodiments, a sketch cache is comprised of datastream locality information, identity matching information, storage sub-system information, temporal locality, spatial locality, access patterns, historical patterns, or any other appropriate information. In 812, the sketch cache is checked for the sketch computed in 810. In the event that the sketch computed in 810 is not found in the sketch cache, then the data segment is not determined to be similar to a data segment in the locale, and control passes to 814. In 814, the data segment is stored, the ID associated with the data segment is returned, and the process ends. In various embodiments, the data segment is compressed, transmitted, replicated, or processed in any appropriate way. In the event that the data segment sketch computed in 810 is found or a portion thereof in the sketch cache in 812, then the data segment is similar to a data segment in the locale, and control passes to 816.

In 816, the data segment identified from the sketch cache to be similar to the received data segment is located in the data storage system. In 818, an encoding of the received data segment is computed. In various embodiments, the delta compression encoding (e.g., delta compression of FIG. 7) is based at least in part on the similar data segment and comprises a set of data blocks in the first data segment not present in the data segment in the locale and a set of references to subsets of data in the data segment in the locale (e.g., data offsets into the similar data segment, a data offset and length of sequence, or any other appropriate encoding). In some embodiments, a data segment is encoded based on a previously stored data segment which itself is encoded based on a previously stored data segment; a delta encoding of a delta encoded segment. In some embodiments, one or more data segments are identified to be similar to the received data segment in addition to the similar data segment identified in 816. In some embodiments, the delta compression encoding is based at least in part on the similar data segment identified in 816 and the one or more additional similar data segments. In various embodiments, the one or more data segments identified or selected to be similar to the received data segment are identified or selected based at least in part on one or more of the following: temporal locality (e.g., a segment received at a time similar to the time another segment is received), spatial locality (e.g., a segment stored in a location similar or close to another segment), ease of access (e.g., a segment is readily accessed as compared to another segment, located at an access point, located at a memory boundary, etc.), expected compression (e.g., the segment is expected to compress to a desirable size, below a threshold size, etc.), frequency of selection for other compressed segments (e.g., the segment is used as a reference to store a plurality of other segments, where the plurality is above a threshold size or is a maximum or in a "top ten" or other list, etc.), or based on any other appropriate criteria.

In 820, the encoding is checked to see if it is smaller than the received data segment. If it is determined that the encoding is not smaller than the received data segment, control passes to 822. In 822, the data segment is stored in the database along with data segment metadata, the ID associated with the data segment is returned, and the process ends. In some embodiments, if the encoding is not smaller than the received data segment, the encoding is stored in place of or in addition to the received data segment. In some embodiments, if the encoding is not smaller than the received data segment, the encoding is transmitted or replicated in place of or in addition to the received data segment.

If it is determined in 820 that the encoding is smaller than the received data segment, control passes to 824. In 824, the encoding is stored. In various embodiments, the encoding is compressed (e.g., using Huffman coding, Lempel-Ziv coding, Lempel-Ziv-Welch coding, etc.), transmitted (e.g., transmitted between two systems where a reduction in transmitted data is desired and the deduplicated and delta compressed segments enable a reduced amount of data transmitted between two systems), replicated (e.g., stored on a replica system that replicates data stored on the storage system), or processed in any other appropriate way. In 826, the received data segment ID and similar data segment ID are returned, and the process ends. In some embodiments, the similar data segment ID is stored as part of the encoding and not returned.

In some embodiments, the decision for 820 is based on a percentage reduction of the storage required for the segment. For example, if the encoded data segment is bigger than the 80% of the size of the data segment, then the data segment is stored as itself and not as a reference to a previously stored segment and a difference (e.g., an encoded data segment). In some embodiments, the decision for 820 is based at least in part on the balance between the computation required for reconstruction of the encoded segment versus the space utilized for storing a segment and/or the encoded segment.

Figure 9:
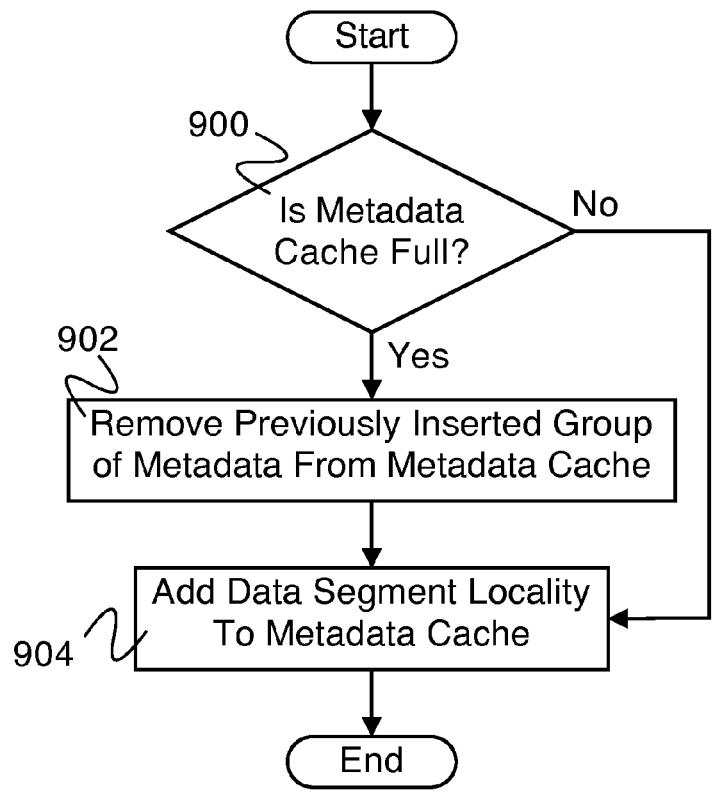
FIG. 9 is a flow diagram illustrating an embodiment of a process for selecting a stream indicated locale of data segments.

FIG. 9 is a flow diagram illustrating an embodiment of a process for selecting a stream indicated locale of data segments. In some embodiments, the process of FIG. 9 implements 806 of FIG. 8. In the example shown, in 900, the metadata cache is checked to see if it is full. If it is determined that the metadata cache is full, control passes to 902. In 902, the least used group of metadata is removed from the metadata cache. Removing a previously inserted group of metadata (e.g., the least used) from the metadata cache corresponds to removing the least used group of segments from the locale. Alternative policies for removing groups of metadata include removing the oldest, newest, other statistically based selection methods, or selecting groups of meta data based on the results of a function computation. Control then passes to 904. If it is determined in 900 that the metadata cache is not full, control passes directly to 904. In 904, the data segment locality is added to the metadata cache.

Figure 10:
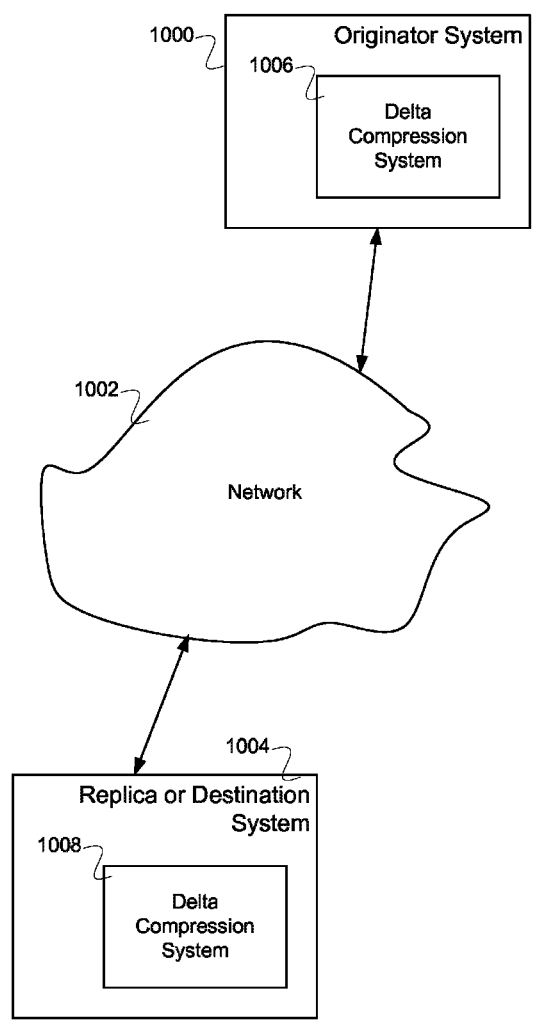
FIG. 10 is a block diagram illustrating an embodiment of a system for transmitting or replicating segments using stream locality based delta compression.

FIG. 10 is a block diagram illustrating an embodiment of a system for transmitting or replicating segments using stream locality based delta compression. In the example shown, originator system 1000 includes delta compression system 1006. Delta compression system 1006 includes a stream locality cache that stores similarity measures (e.g., sketches) for one or more localities that include metrics for identifying similar segments. In various embodiments, localities are identified by a previous similar segment match, a previous identical segment match, a file name, a client name, a metadata associated with a data stream or data block, or any other appropriate locality identifier. Originator system 1000 is coupled to network 1002. Replica or destination system 1004 is coupled to network 1002. Originator system 1000 and replica or destination system 1004 are able to communicate via network 1002. Replica or destination system 1004 replicates data stored on originator system 1000 or receives transmissions of segments from originator system 1000. Replica or destination system 1004 includes delta compression system 1008. Delta compression system 1008 includes a stream locality cache that stores similarity measures (e.g., sketches) for one or more localities that include metrics for identifying similar segments.

Figure 11A:
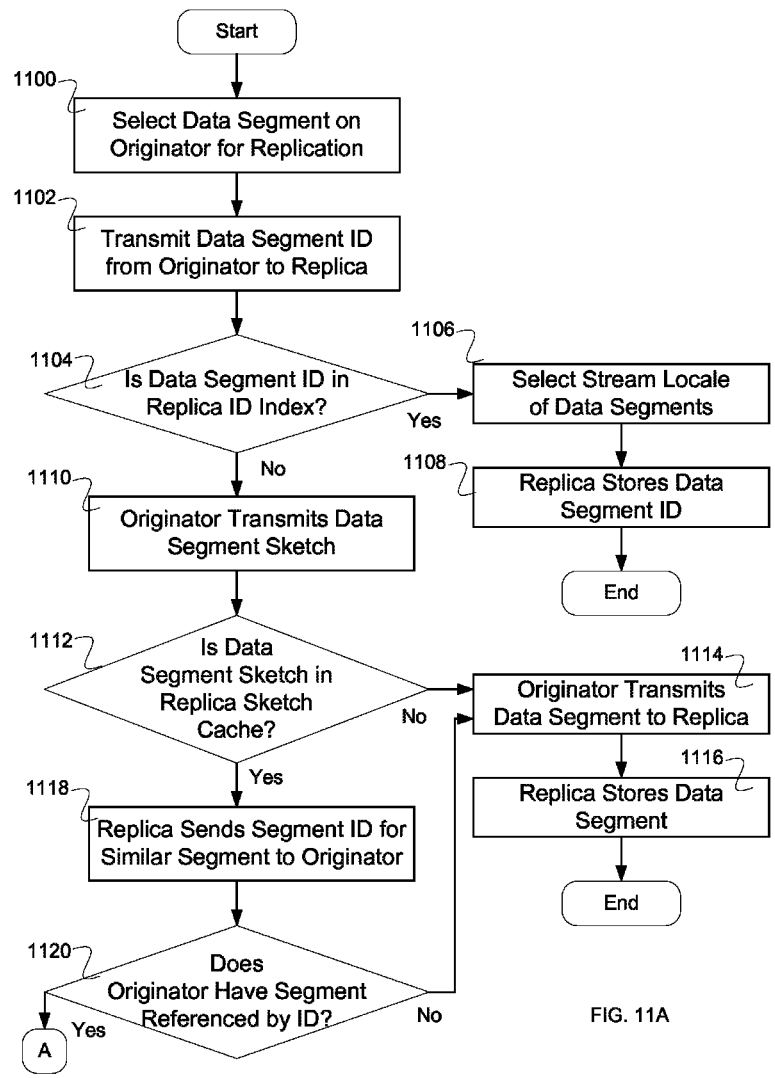
FIGS. 11A and 11B are flow diagrams each illustrating an embodiment of a process for replicating a segment using stream locality based delta compression.
Figure 11B:
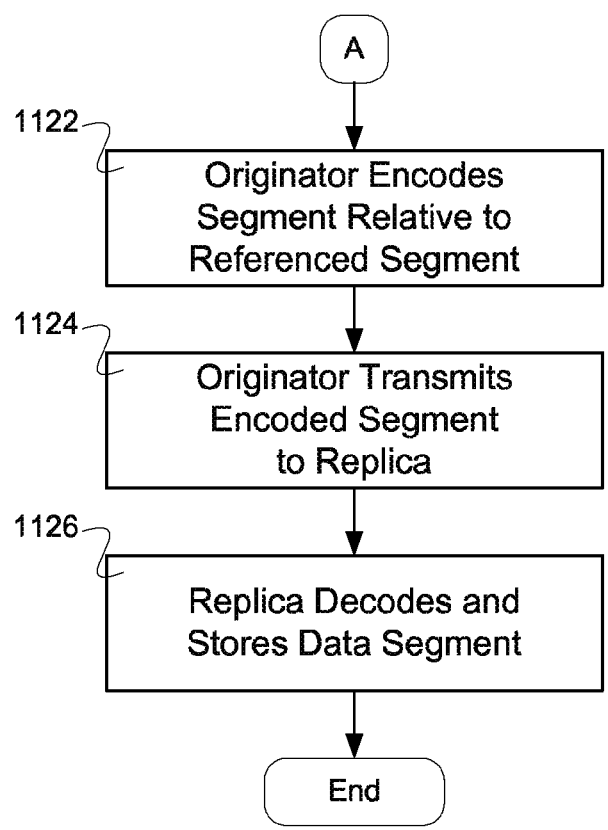

FIGS. 11A and 11B are flow diagrams each illustrating an embodiment of a process for replicating a segment using stream locality based delta compression. In some embodiments, the process of FIGS. 11A and 11B is executed on the system(s) of FIG. 10. In the example shown, in 1100 a data segment on an originator (e.g., an originator system—for example, originator system 1000) is selected for replication. In 1102, the data segment ID is transmitted from originator to replica. In 1104, it is determined whether a data segment ID is in a replica ID index. For example, a replica system performs an identity compression by determining whether the data segment has been previously stored using an index of previously stored or transmitted data segment identifiers (e.g., an index of fingerprints of segments already stored or transmitted). In the event that the data segment ID is in the replica ID index, in 1106 a stream locale of data segments is selected, and in 1108 the replica stores the data segment ID. For example, the data segment is stored by the replica by storing a reference to the data segment (e.g., the data segment ID) and the data segments "local" to the identified data segment are selected to be put in a cache. In the event that the data segment ID is not in the replica ID index, then in 1110 the originator transmits the data segment sketch.

In 1112, it is determined whether the data segment sketch is in the replica sketch cache. For example, the data segment sketch values are matched against values in the sketch cache. The sketch cache stores sketches of likely candidate localities (e.g., sketches associated with segments local to stored segments that have recently found to have been identical to input data stream or data block segments). In the event that a data segment sketch is not in the replica sketch cache, in 1114 the originator transmits the data segment to replica, and in 1116 the replica stores the data segment. In the event that the data segment sketch is in the replica sketch cache, in 1118 the replica sends segment ID for similar segment to originator.

In 1120, it is determined whether the originator has the segment referenced by the ID. In the event that the originator does not have the segment referenced by the ID, control passes to 1114. In the event that the originator does have the segment reference by the ID, in 1122 of FIG. 11B the originator encodes the segment relative to the referenced segment. In 1124, the originator transmits the encoded segment to the replica. In 1126, the replica decodes the segment and stores the data segment. In some embodiments, the replica stores the data segment encoded (e.g., the difference from the reference data segment and a reference to the referenced data segment).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for processing data, comprising:
  a storage system module configured to store a plurality of data segments having identifiable segment boundaries, and to receive one or more of a data stream and a data block to be processed for storage;
  a deduplication module configured to use one or more processors to determine a stream indicated locale, the locale including a selection of a plurality of previously stored data segments satisfying a locality criterion with respect to a portion of the one or more of the data stream and the data block being processed for storage; and
  a delta compression module configured to use one or more processors to determine, based at least in part on the selection of the plurality of stored data segments satisfying the locality criterion, that a first data segment sketch for a first data segment included in the portion of the one or more of the data stream and the data block being processed for storage is similar to one or more data segment sketches amongst data segment sketches of a limited sketch index corresponding to the data segments in the determined locale, wherein when it is determined the first data segment sketch is not similar to the one or more data segment sketches amongst data segment sketches of the limited sketch index, the delta compression module is configured to determine whether the first data segment sketch is similar to one or more data segment sketches amongst data segment sketches of a master sketch index.

2. The system of claim 1, wherein the identifiable segment boundaries of the plurality of data segments correspond to one or more of content-based segment boundaries, fixed-length segment boundaries, variable length segment boundaries, overlapping segment boundaries, non-overlapping segment boundaries.

3. The system of claim 1, wherein the deduplication module segments the one or more of the data stream and the data block into a plurality of data segments.

4. The system of claim 1, wherein the delta compression module determines the stream indicated locale based at least in part by selecting a set of data segments received or stored in proximity to the previously stored data segments.

5. The system of claim 1, wherein the delta compression modules is further configured to compute an encoding of the first data segment.

6. The system of claim 5, wherein the delta compression module is further configured to store the encoding of the first data segment.

7. The system of claim 5, wherein the delta compression module is further configured to transmit the encoding of the first data segment.

8. The system of claim 5, wherein the encoding of the first data segment is based at least in part on the data segment in the locale.

9. The system of claim 5, wherein the encoding of the first data segment comprises an indication of a set of data blocks in the first data segment not present in the data segment in the locale and an indication of a set of data blocks in the data segment in the locale.

10. The system of claim 5, wherein the delta compression module is further configured to determine whether the encoding is smaller than the first data segment.

11. The system of claim 1, wherein determining that the first data segment sketch for the first data segment is similar to one or more data segment sketches amongst data segment sketches of the limited sketch index is based on a sketch function that comprises one or more functions that can return a similar value for similar data segments.

12. The system of claim 11, wherein sketch function values are determined to be similar based on one or more of the following methods: numeric difference, hamming distance, locality-sensitive-hashing, and nearest-neighbor-search.

13. The system of claim 1, wherein the first data segment is similar to one or more other data segments in the previous stream indicated locale in addition to the data segment in the previous stream indicated locale.

14. The system of claim 13, wherein the delta compression module is further configured to compute an encoding of the first data segment.

15. The system of claim 14, wherein the encoding is based at least in part on the data segment in the previous stream indicated locale and the one or more other data segments.

16. The system of claim 13, wherein the one or more other data segments and the data segment in the previous stream indicated locale are identified based at least in part on one or more of the following: temporal locality, spatial locality, ease of access, expected compression, and frequency of selection for other compressed segments.

17. The system of claim 1, wherein the data segment sketches of the limited sketch index are stored in a cache in response to determining previously stored data segments satisfy the locality criterion with respect to a portion of the one or more of the data stream and the data block.

18. A method for processing data, comprising:
  using one or more processors to store a plurality of data segments having identifiable segment boundaries;

using the one or more processors to receive one or more of a data stream and a data block to be processed for storage;

using the one or more processors to determine a stream indicated locale, the locale including a selection of a plurality of previously stored data segments satisfying a locality criterion with respect to a portion of the one or more of the data stream and the data block being processed for storage; and using the one or more processors to determine, based at least in part on the selection of the plurality of stored data segments satisfying the locality criterion, that a first data segment sketch for a first data segment included in the portion of the one or more of the data stream the data block being processed for storage is similar to one or more data segment sketches amongst data segment sketches of a limited sketch index corresponding to the data segments in the determined locale, wherein when it is determined the first data segment sketch is not similar to the one or more data segment sketches amongst data segment sketches of the limited sketch index, the one or more processors determine whether the first data segment sketch is similar to one or more data segment sketches amongst data segment sketches of a master sketch index.

19. The method of claim 18, wherein the determining of the stream indicated locale comprises selecting a set of data segments received or stored in proximity to the previously stored data segment.

20. The method of claim 18, further comprising encoding the first segment based at least in part on the data segment in the locale.

21. The method of claim 20, wherein the encoding of the first data segment comprises an indication of a set of data blocks in the first data segment not present in the data segment in the locale and an indication of a set of data blocks in the data segment in the locale.

22. The method of claim 20, further comprising determining whether the encoding of the first data segment is smaller than the first data segment.

23. The method of claim 18, wherein determining that the first data segment sketch for first data segment is similar to the one or more data segment sketches amongst the data segments sketches of the limited sketch index is based on a sketch function that comprises one or more functions that can return a similar value for similar data segments.

24. A computer program product for processing data, the computer program product being embodied in a non-transitory computer readable storage medium and comprising computer instructions for:

storing a plurality of data segments having identifiable segment boundaries;

receiving one or more of a data stream and a data block to be processed for storage;

determining a stream indicated locale, the locale including a selection of a plurality of previously stored data segments satisfying a locality criterion with respect to a portion of the one or more of the data stream and the data block being processed for storage;

determining, based at least in part on the selection of the plurality of stored data segments satisfying the locality criterion, that a first data segment sketch for a first data segment included in the portion of the one or more of the data stream and the data block being processed for storage is similar to one or more data segment sketches amongst data segment sketches of a limited sketch index corresponding to the data segments in the determined locale, wherein when it is determined the first data segment sketch is not similar to the one or more data segment sketches amongst data segment sketches of the limited sketch index, the instructions further include determining whether the first data segment sketch is similar to one or more data segment sketches amongst data segment sketches of a master sketch index.

* * * * *